United States Patent [19]

Yuen et al.

[11] Patent Number: 4,757,493
[45] Date of Patent: Jul. 12, 1988

[54] MULTI-PARTY TELEPHONE CONFERENCING APPARATUS

[75] Inventors: Ki S. Yuen, Fairview NT, Hong Kong; Bernard Moret, Avanchets, Switzerland

[73] Assignee: Motorola Inc., Schaumburg, Ill.

[21] Appl. No.: 56,188

[22] Filed: Jun. 1, 1987

[51] Int. Cl.$^4$ .................. H04Q 11/04; H04M 3/56
[52] U.S. Cl. ............................................. 370/62
[58] Field of Search ............... 370/62; 379/202, 204, 379/205

[56] References Cited

U.S. PATENT DOCUMENTS

| | | | |
|---|---|---|---|
| 4,360,910 | 11/1982 | Segal et al. | 370/62 |
| 4,387,457 | 6/1983 | Münter | 370/62 |
| 4,388,717 | 6/1983 | Burke | 370/62 |
| 4,475,190 | 10/1984 | Marouf et al. | 379/202 |
| 4,495,616 | 1/1985 | Shuh | 379/202 |
| 4,566,096 | 1/1986 | Sarson et al. | 370/62 |
| 4,635,252 | 1/1987 | Küchler | 370/62 |

Primary Examiner—A. D. Pellinen
Assistant Examiner—Geoffrey S. Evans
Attorney, Agent, or Firm—Joe E. Barbee; Eugene A. Parsons

[57] ABSTRACT

Multi-party conferencing apparatus for use in a pulse code modulated, time division multiplexed telephone communication system including a data bus on which operating times are divided into equal frames of time and each channel of a plurality of channels has a transmit time slot and a receive time slot in each time frame. Voice signals on conferencing channels are sampled in each time frame and compared in the conferencing apparatus with the highest amplitude sample being rturned to all conferencing channels except the channel on which it originated and a second highest amplitude sample being returned to the channel originating the highest sample.

5 Claims, 12 Drawing Sheets

MULTI-PARTY TELEPHONE CONFERENCING APPARATUS

BACKGROUND OF THE INVENTION

Conferencing, wherein several telephone users talk to each other, is a popular feature in private automatic branch exchange (PABX) systems. Generally in these systems voices are converted to pulse code modulated (PCM) signals, which PCM signals are transmitted serially on a PCM data bus. In prior conferencing systems it is necessary to convert the PCM signals into the analog domain or into linear binary signals. In one of the latest conferencing systems a chip converts the incoming serial PCM signals into parallel form. The parallel data is then converted to 14-bit linear coded binary words from the 8-bit non-linear format in which it was originally coded. The linear-coded voice data from more than one source is then summed in a standard adder circuit to create the composite conference signal. Following this addition, a circuit verifies that the sum does not overflow line capacity. If the sum is too high a circuit automatically attenuates the conference signal to a level the line can accept. The signal is then reconverted into the original PCM-coded format and then converted from parallel form into a serial PCM bit stream. The conference signal can then be supplied back to the various conferencing channels.

These prior art conferencing systems are extremely complicated and expensive. Also, the various conversions and the attenuation introduce distortion into the signals.

SUMMARY OF THE INVENTION

The present invention pertains to multi-party conferencing apparatus for use in a telephone communications system, which apparatus includes input circuitry for receiving voice data from each channel of a plurality of channels and providing a plurality of amplitude signals indicative of the amplitude of the voice data, each channel of the plurality of channels having a corresponding amplitude signal for the voice data thereon, comparator circuitry coupled to receive the plurality of amplitude signals from the input circuitry for comparing the plurality of amplitude signals and providing first and second output signals indicative of channels corresponding to the highest and second highest amplitudes of voice data, respectively, output circuitry for supplying voice data to the plurality of channels, and switching circuitry coupled to the input circuitry, the comparator circuitry and the output circuitry for operating in response to the first and second output signals from the comparator circuitry to connect the voice data from the channel corresponding to the first output signal to all other channels of the plurality of channels and to connect the voice data from the channel corresponding to the second output signal to the channel corresponding to the first output signal.

Also, the invention pertains to a method of multi-party conferencing in a pulse code modulated, time division multiplexed, telephone communication system having a plurality of channels, the method comprising the steps of sampling the voice signals on each conference channel each frame, selecting the conference channels having the highest and second highest amplitude samples in each frame, and supplying the highest amplitude sample to all conferencing channels except the conferencing channel from which the highest amplitude sample is obtained and supplying the second highest amplitude sample to the conferencing channel from which the highest amplitude sample is obtained, the samples being supplied in a single frame subsequent to the frame in which the supplied samples are obtained.

It is an object of the present invention to provide a new and improved multi-party conferencing apparatus for use in a telephone communication system.

It is a further object of the present invention to provide multi-party conferencing apparatus which is much simpler to produce, cheaper, and introduces less distortion.

These and other objects of this invention will become apparent to those skilled in the art upon consideration of the accompanying specification, claims and drawings.

BRIEF DESCRIPTION OF THE DRAWINGS

Referring to the drawings.

DESCRIPTION OF THE PREFERRED EMBODIMENT

The present invention is multi-party conferencing apparatus, which may be constructed in an electronic logic circuit design which can be easily implemented into an integrated circuit. The conferencing apparatus operates in conjunction with an electronic switching system such as a digital PABX or public telephone switches. In such switching systems voices are converted to standard PCM codes in either A-law or Mu-law. In general, these PCM codes will appear on a PCM bus within given time frames. The present conferencing circuit provides mixing of selected N-channels so that N-parties on the channels can talk to and listen to each other at the same time. The mixing process is accomplished by a level priority coding technique. Within each time frame, the highest magnitude PCM code is selected. This code will be received by all other conferencing channels on the following time frame. The conferencing channel with the highest magnitude PCM code will not receive (hear) its own voice. Instead, the next highest magnitude PCM code is saved and will be received by the conferencing channel with the highest magnitude. This technique has been demonstrated to operate satisfactorily because human voices are changing in magnitude all the time and there is no correlation between two or more speeches. Therefore, in effect, mixing voices from multi-channels is achieved.

Figure 1:
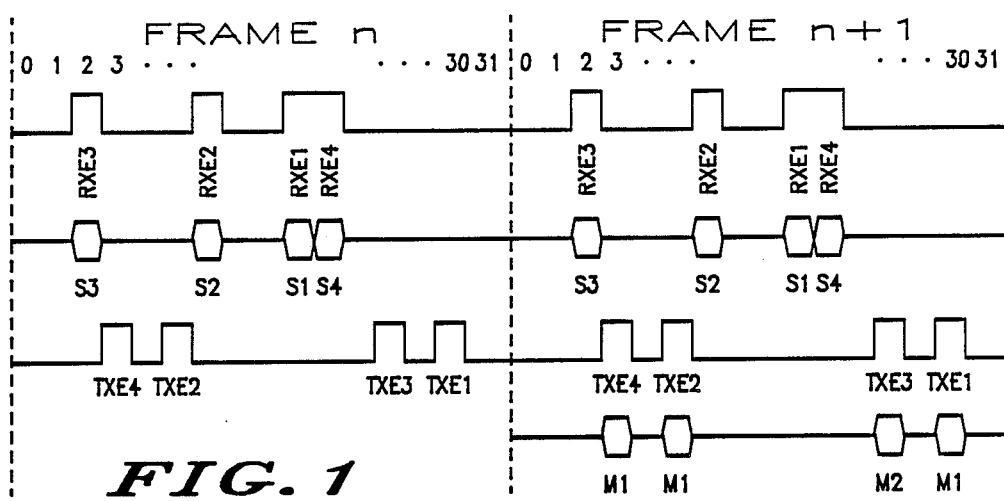
FIG. 1 is a timing diagram illustrating two frames of timing information.

Referring specifically to FIG. 1, a time frame N and a time frame N+1 are illustrated. In the time frame N, the party's voice signal on each conferencing channel is sampled once and the samples, designated S1 through S4, are sent to the PCM bus on the conferencing channel's transmit time slot. The conferencing apparatus receives the four samples as S1–S4 during the four time slots RXE1 through RXE4, where RXE K is the received time slot of the conferencing apparatus to receive the voice from channel k. The conferencing apparatus selects the maximum magnitude sample, M1, and second maximum magnitude sample, M2, from among the four samples S1-S4. For example, if the maximum magnitude sample is in the RXE3 time slot, i.e. comes from channel 3, during the next time frame (N+1), the conferencing apparatus sends out the M1 sample to channels 1, 2 and 4 at times TXE1, TXE2 and TXE4 (TXE k is the transmit time slot of the conferencing apparatus for party k) and the M2 sample is sent to channel 3 during the time slot TXE3 in the same time frame.

It should be noted that in the conferencing apparatus every party receives a voice sample with a magnitude that is the largest among those of the remaining parties. For example, if there is only one party speaking, then all of the voice samples will be the maximum magnitude and the voice samples will be sent to all of the other conferencing channels. Therefore, all parties on the conferencing channels hear the speaker's voice clearly.

Figure 2:
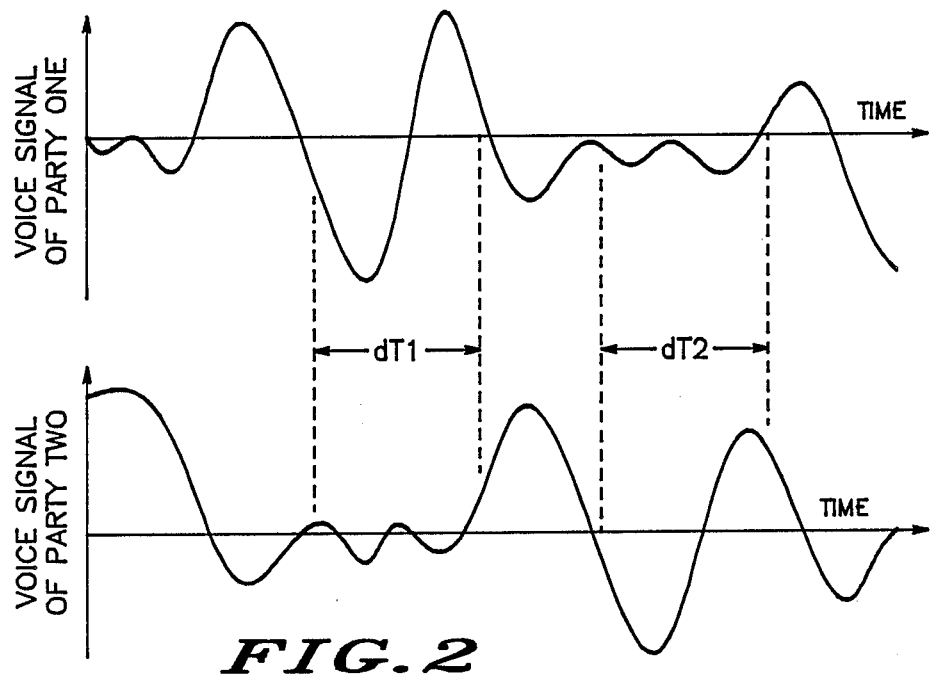
FIG. 2 illustrates two voice signals and a comparison therebetween.

Referring specifically to FIG. 2, if there are two or more parties speaking at comparable loudness, no speaker will produce maximum magnitude samples throughout the speech. For a short time interval, e.g. dT1, Party 1 will produce the maximum magnitude samples while at other short time intervals, e.g. dT2, Party 2 will provide maximum magnitude samples. Hence, other conferencing channels will hear both Party 1 and Party 2 over a certain time period T.

Still assuming that four Parties or channels are conferencing, the conferencing apparatus contains four time slot assignor circuits (TSAC). The four TSACs serve the four conferencing channels, i.e. every TSAC has a transmit time slot which matches with one of the conferencing channel's receive time slot and the TSAC's receive time slot matches with the conferencing channel's transmit time slot. Hence, every sample from the conferencing channels is received and every output from the conferencing apparatus is sent to the conferencing channels.

Figure 3:
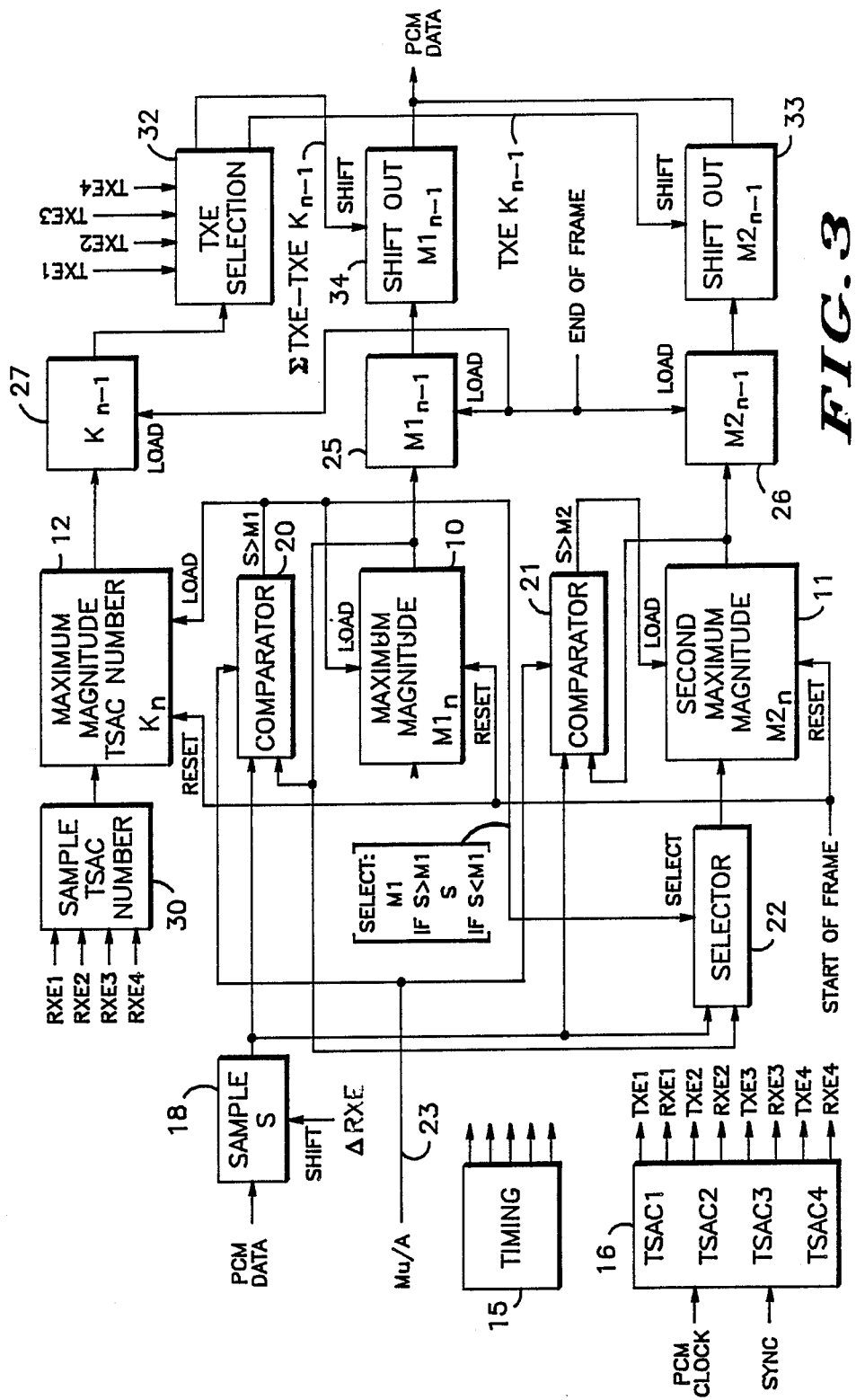
FIG. 3 is a block diagram of multi-party conferencing apparatus embodying the present invention.
Figure 4:
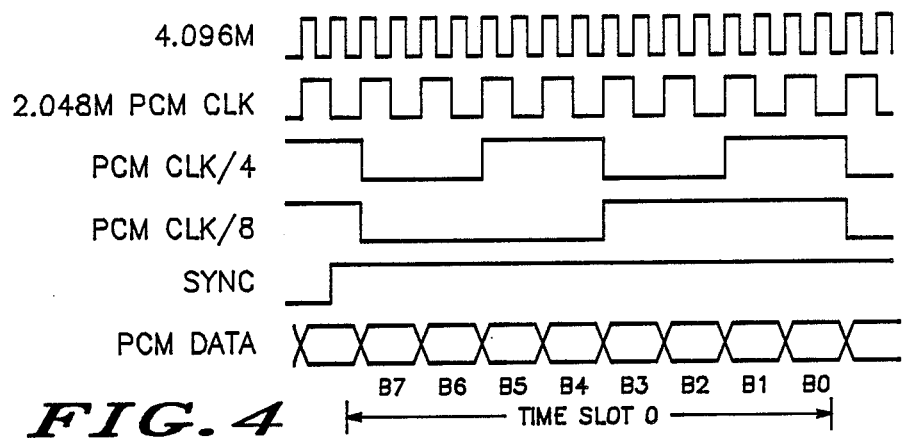
FIGS. 4–9 illustrate timing signals which appear at various points in the circuitry.

Referring specifically to FIG. 3, a block diagram of multi-party conferencing apparatus embodying the present invention is illustrated. For every timeframe, the maximum magnitude sample M1, the second maximum magnitude sample M2 and the channel K from which M1 is received are required to be determined and stored in three registers, maximum magnitude register 10, second maximum magnitude register 11 and maximum magnitude TSAC number register 12. At the start of each time frame, the three registers 10, 11 and 12 are reset by a signal generated from a timing block 15, as will be explained presently. TSAC block 16 provides receive and transmit time slots for each conferencing channel in response to PCM clock and synchronizing signals received from timing block 15. It should be understood that the designation RXE K designates a time slot in which the conferencing apparatus receives voice data from the K channel and the designation TXE k indicates the time slot in which the conferencing apparatus sends voice data to the K channel. In the embodiment disclosed it is assumed that four channels are conferencing and, accordingly, TSAC1 through TSAC4 are utilized.

In every receive time slot RXE1 through RXE4 in time frame N, the conferencing apparatus fetches a sample S from the PCM bus by way of a sample register 18. Each sample is supplied to one input of a comparator 20, an input of maximum magnitude register 10, one input of a comparator 21, and one input of a selector 22. The PCM data can be coded in accordance with Mu-law or A-law and this decision is made by an operator who supplies a signal on a line 23 to an input of comparator 20 and an input of comparator 21. This particular operation will be described in more detail presently. Output signals are supplied from maximum magnitude register 10 to a storage register 25 and to second inputs of comparator 20 and selector 22. The output of second maximum magnitude register 11 is supplied to a second storage register 26 and to a second input of comparator 21. The output of TSAC number register 12 is supplied to a third storage register 27. The output of comparator 20 is connected to a load input of maximum magnitude register 10 and TSAC number register 12, as well as a select input of selector 22. The output of comparator 21 is connected to a load input of second maximum magnitude register 11.

Basically, the operation is as follows. Maximum magnitude register 10 has a previous M1 voice sample stored therein and second maximum magnitude register 11 has a previous M2 voice sample stored therein. A voice sample is supplied by sample register 18, which sample is compared to the previous maximum magnitude sample from register 10 in comparator 20. The sample is also supplied to the input of maximum magnitude register 10. Simultaneously a TSAC number identifying a specific one of the receive time slots is generated in a circuit 30, which number is supplied to an input of TSAC number register 12. If the new sample supplied by register 18 has a greater amplitude than the stored sample supplied by register 10, comparator 20 provides a output to register 10 which causes the new sample to be loaded into the register. Simultaneously the TSAC number identifying the receive time slot of the sample is loaded into TSAC number generator 12. Also, selector 22 selects the stored sample from maximum magnitude register 10 and supplies that to the input of second maximum magnitude register 11. While comparator 20 is comparing the new sample to the stored M1 sample, comparator 21 is comparing the new sample to the stored M2 sample. If the new sample from register 18 has a greater magnitude than the stored sample from register 11, comparator 21 provides a signal to the load input of register 11 and the sample selected by selector 22 is loaded into register 11, in this case the previously stored M1 sample. Similarily, if the amplitude of the new sample does not exceed the amplitude of the stored sample, comparator 20 does not supply a signal to the load inputs of registers 10 and 12 so that the sample and identification number stored therein, respectively, remain in the registers. Also, selector 22 selects the new sample from register 18 which, if it exceeds the old sample in register 11, is loaded into register 11.

When the frame ends and all of the samples in a particular frame have been compared, the final results are loaded into storage registers 25, 26 and 27. The TSAC number from register 27 is then used to select a specific transmit time slot, TXE1 through TXE4, in a TXE selection circuit 32. The TXE selection circuit 32 provides an input signal to the shift control of a shift register 33. The input of shift register 33 is connected to the output of storage register 26 and the output of shift register 33 is connected to the PCM data bus. TXE selection circuit 32 provides a second shift signal output to a shift register 34, the input of which is connected to storage register 25 and the output of which is connected to the PCM data bus. TXE selection circuit 32 causes shift register 33 to supply the voice sample stored therein to the PCM data bus during the transmit time slot associated with the channel having the greatest amplitude voice sample thereon. Similarly, TXE selection circuit 32 causes the sample stored in storage register 25 to be supplied to the PCM bus during the transmit time slots of each of the other conferencing channels. The voice samples stored in registers 25 and 26 are supplied to the PCM bus during the next frame, subsequent to the frame in which the samples were compared. As previously stated, in conjunction with FIG. 1 assume a voice sample in the RXE3 time slot (channel 3) contains the maximum magnitude voice sample M1. Therefore, TSAC number generator 12 designates channel 3 as the channel containing the maximum magnitude voice sample. TXE selection circuit 32 selects TXE3 time slot and shifts the M2 voice sample out of shift register 33 to PCM bus during that time slot. TXE1, TXE2 and TXE4 are supplied to enable shift register 34 so that the M1 voice sample is shifted out of register 34 to the PCM bus during those time slots. Thus the first, second and fourth channels receive the highest amplitude voice sample and the third channel, from which the highest amplitude voice sample originated, receives the next highest voice sample.

Figure 10:
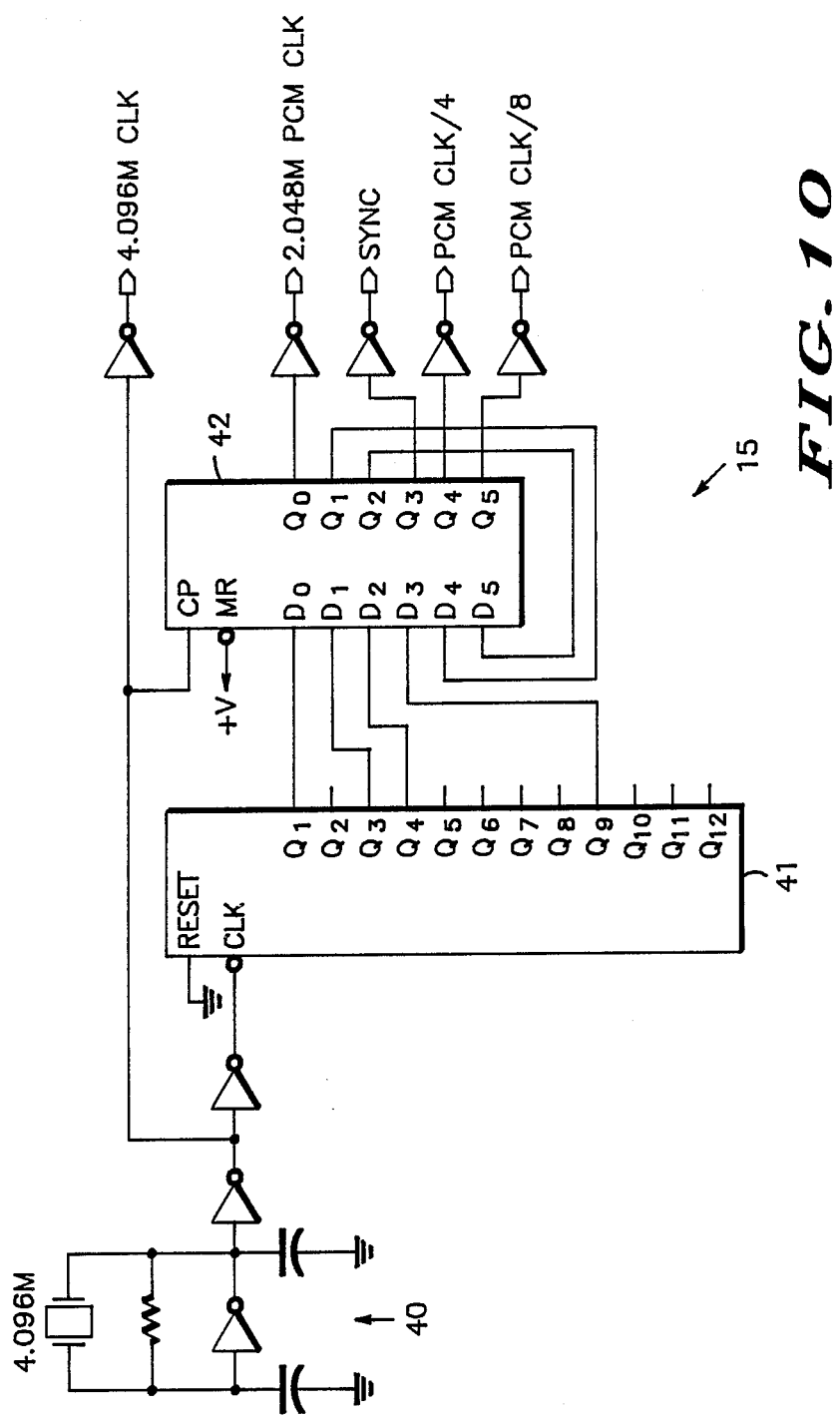
FIGS. 10–14 illustrate circuitry for a specific embodiment of the multi-party conferencing apparatus illustrated in block form in FIG. 3.
Figure 11A:
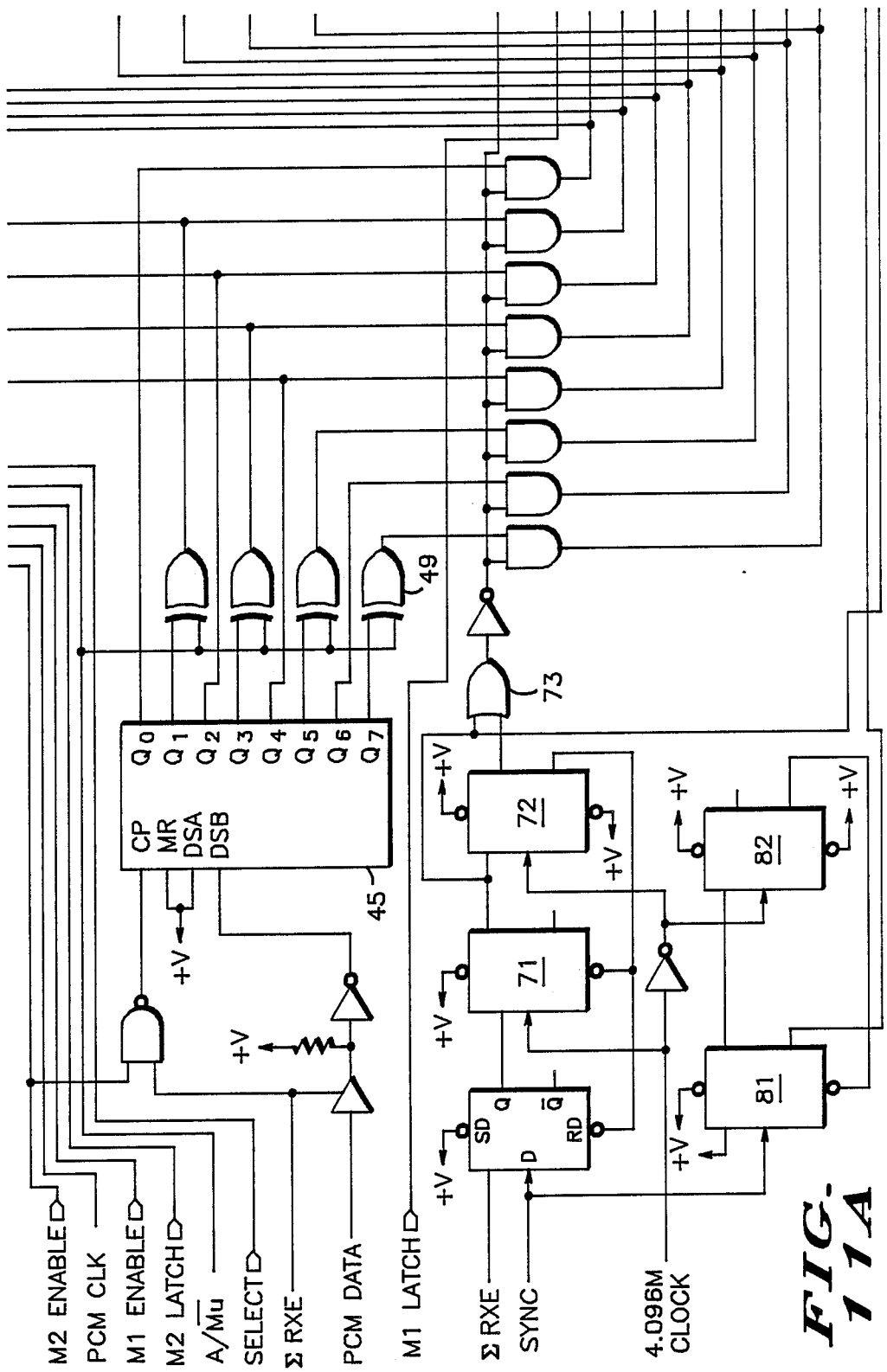
Figure 11B:
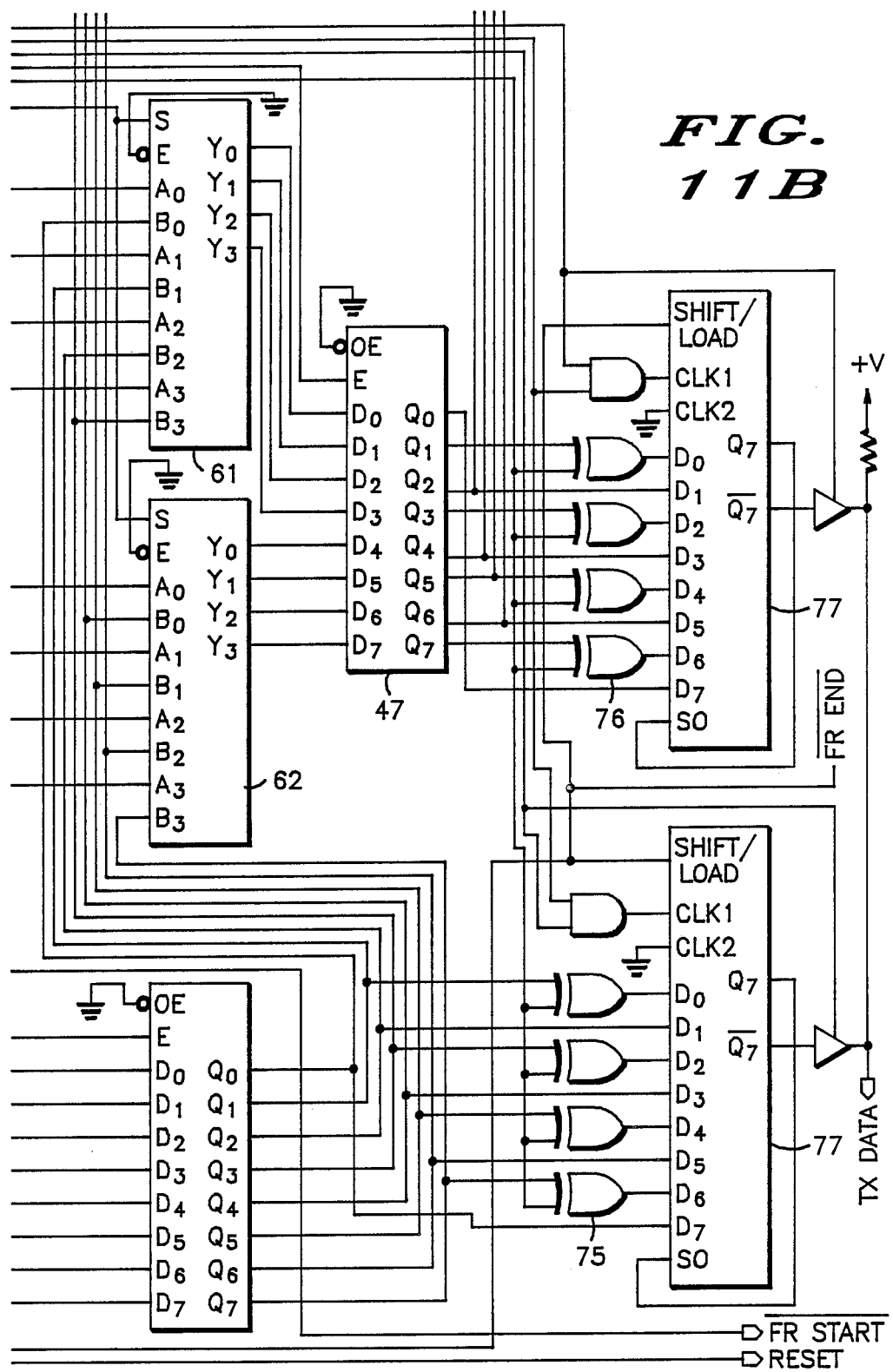
Figure 11E:
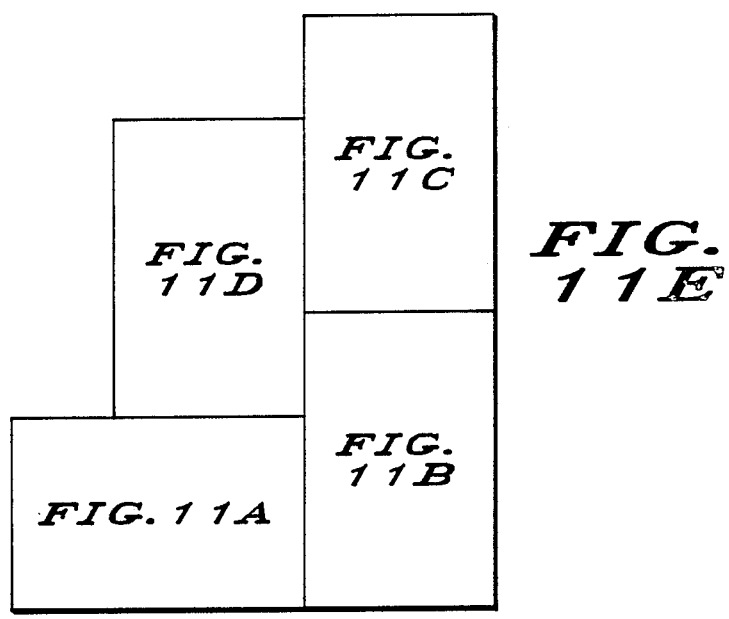
Figure 11C:
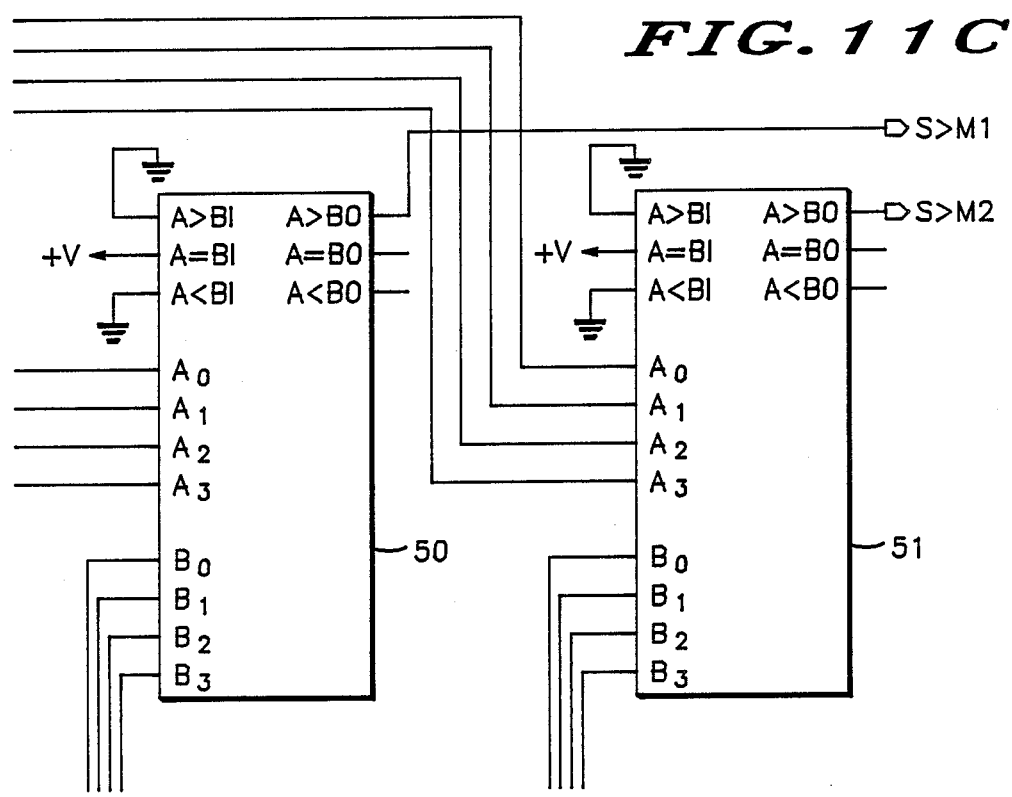
Figure 11D:
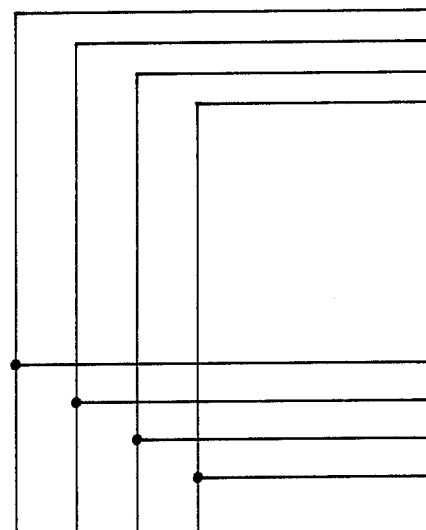
Figure 11D:
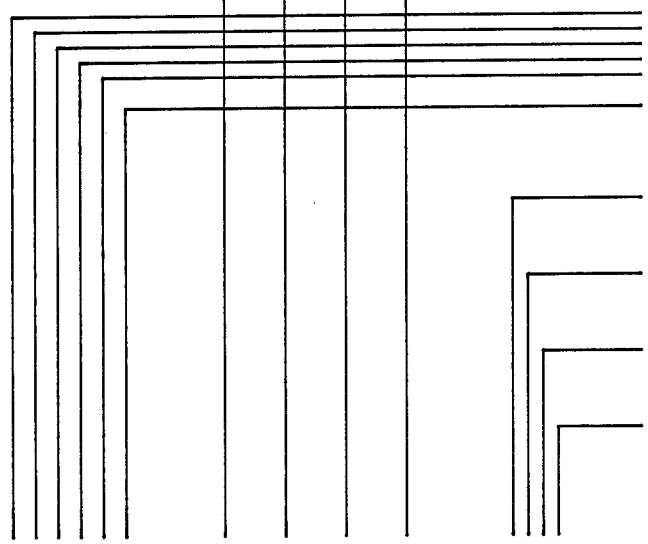

FIGS. 4 through 9 illustrate various timing signals and sample situations in the specific circuitry of FIG. 3, which is illustrated in FIG. 10 through 14. FIG. 10 illustrates the timing block 15, which includes a crystal oscillator 40, a 12 bit binary counter 41, and a flip-flop register 42. Each of the integrated circuits illustrated in FIGS. 10 through 14 are high speed CMOS integrated circuits which may be purchased commercially, for example, from Motorola, Inc., and Motorola identifying numbers are included in the listing below for the convenience of the reader.

Figure 14:
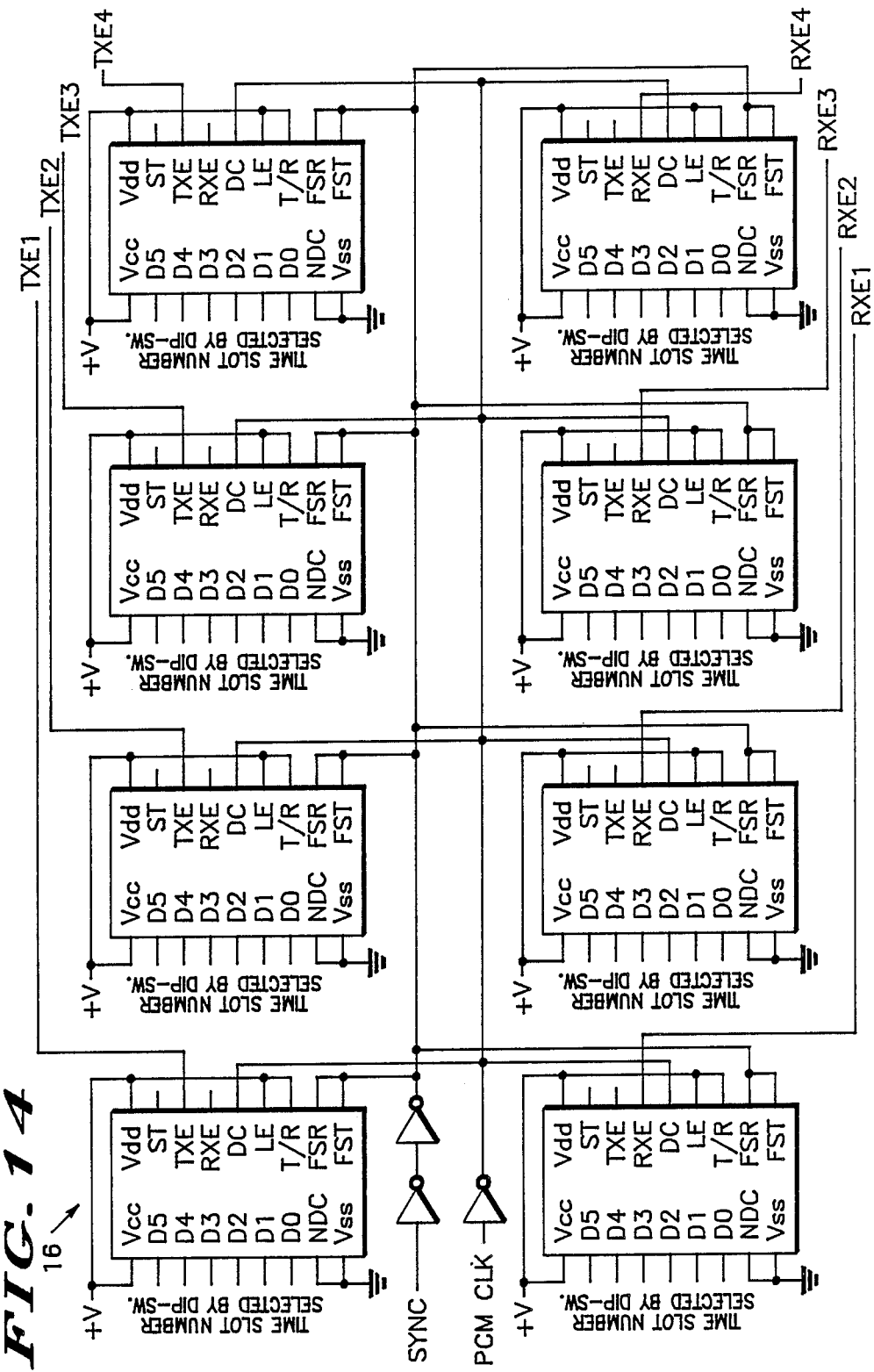

| | |
|---|---|
| Binary Counter 41 | MC74HC4040 |
| Flip-Flop Register 42 | MC74HC174 |
| Shift Register | MC74HC164 |
| Latch Register 46 | MC74HC373 |
| Latch Register 47 | MC74HC373 |
| Flip-Flop Register 48 | MC74HC174 |
| Comparator 50 | MC74HC85 |
| Comparator 51 | MC74HC85 |
| Flip Flop Register 55 | MC74HC74 |
| Flip-Flop Register 56 | MC74HC74 |
| Data Selector 61 | MC74HC157 |
| Data Selector 62 | MC74HC157 |
| Flip-Flop Register 66 | MC74HC74 |
| Flip-Flop Registor 70 | MC74HC74 |
| Flip-Flop Register 71 | MC74HC74 |
| Flip-Flop Register 72 | MC74HC74 |
| Shift Register 77 | MC74HC165 |
| Shift Register 78 | MC74HC165 |
| Flip-Flop Register 80 | MC74HC174 |
| Flip Flop Register 81 | MC74HC74 |
| Flip-Flop Register 82 | MC74HC74 |
| All IC's of FIG. 14 | MC14417 |

Figure 12:
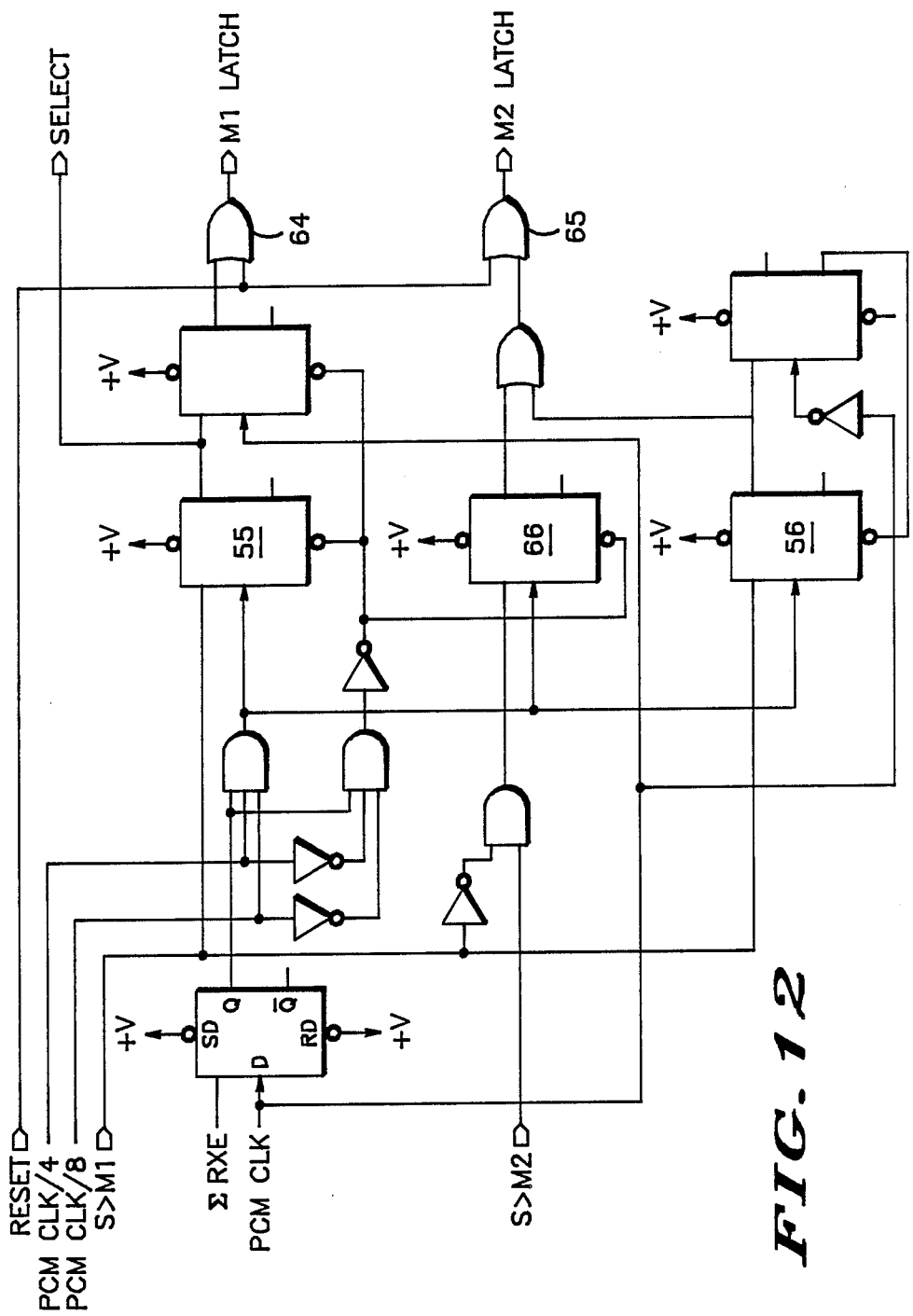
Figure 13:
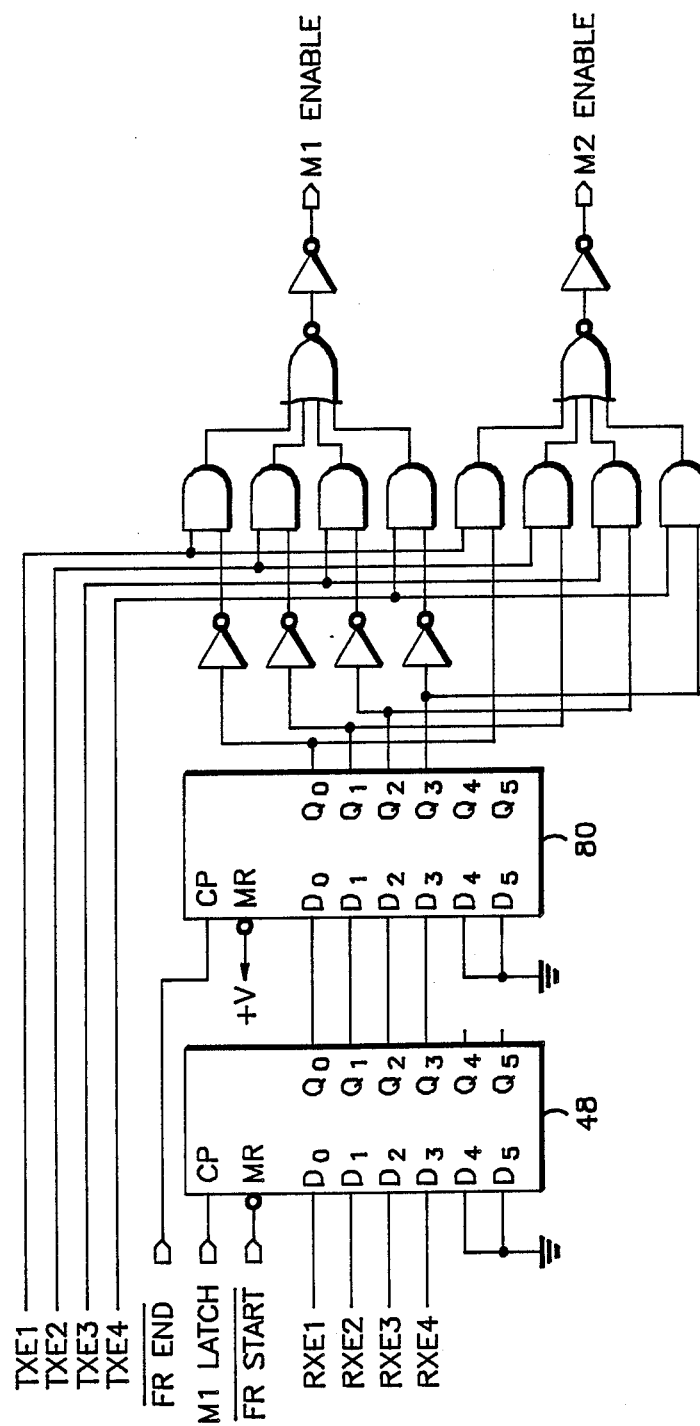

The comparison circuitry of FIG. 3 is illustrated in FIGS. 11 through 13. In particular, an 8 bit serial IN/-parallel OUT shift register 45 is connected to receive voice samples from the PCM bus. Registers 46 and 47 (FIG. 11) and 48 (FIG. 13) are the registers holding M1, M2 and K, respectively. Registers 46 and 47 hold the voice data in the following form. Output Q7 is the sign bit in A-law or the inverted sign bit in Mu-law. Outputs Q6–Q0 indicate the magnitude of the voice sample. Register 48 hold the channel number in the following form. If QA is high than K equals A+1, e.g. if M1 comes from channel 3, then Q2 is high showing that K=3. At the start of a time frame, register 48 is reset to zero.

In a transmit time slot the voice data is supplied to the PCM bus at the rising edge of the PCM clock and becomes stable and ready for fetching at the falling edge of the PCM clock. The transmit PCM data from the PCM bus is clocked into the conferencing apparatus at the falling edge of each PCM clock within its receive time slot, RXE. The PCM data is inverted and held in shift register 45. The data has to be inverted to obtain its magnitude for comparison.

In Mu-law, the first bit of the PCM data is the sign bit. Its magnitude is obtained by inverting the remaining 7 bits. In A-law, the first bit is the sign bit, its magnitude is obtained by inverting the second, fourth, sixth and eighth bits.

During the comparison procedure, the sign bit is ignored and the four most significant bits of the samples magnitude are compared in the comparators. After the sixth falling edge of the PCM clock signal, six bits are entered into shift register 45. Q5 of register 45 holds the inverted sign bit and Q4 through Q1 hold the four most significant bits of the samples magnitude part. In Mu-law, Q4–Q1 already is the magnitude of the sample S. No additional conversion is required. In A-law, Q3 and Q1 must be inverted again to obtain the magnitude of the sample S. To allow both kinds of comparisons, "exclusive or" gates 49 are added to provide the conversion. To convert the data to Mu-law the A/Mu input is pulled low. Thus, the "exclusive or" gates 49 have no effect on Q3 and Q1. In A-law the A/Mu input is pulled high. Then Q3 and Q1 are inverted before comparison. The magnitude is then applied to two four-bit comparators 50 and 51 for comparing with M1 and M2.

Figure 5:
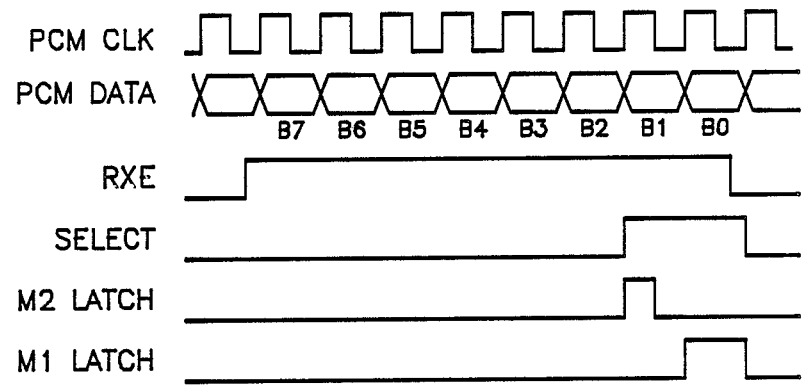
Figure 6:
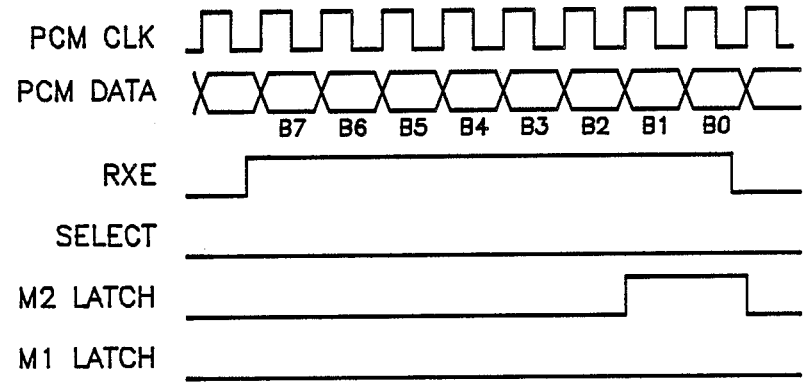

If the four most significant bits of the sample's magnitude is greater than that of the stored M1 (A>B0 output of comparator 50), the output S>M1 will go high after the sixth falling edge of the PCM clock signal. The S>M1 signal is clocked into flip-flop registers 55 and 56 at the seventh rising edge. The SELECT output of shift register 55 is high and data selectors 61 and 62 will select input B, i.e. M1. An M1 LATCH signal supplied by an "or" circuit 64 and an M2 LATCH circuit supplied by an "or" circuit 65 will be changed as illustrated in FIG. 5. Hence, at the end of that receive time slot M1 will replace M2 and S will replace M1. Also, flip-flop register 48 will record the channel number.

If the four most significant bits of the sample's magnitude are not greater than that of M1 but are greater than that of M2, then after the sixth falling edge of the PCM clock signal the output S>M1 will remain low but the output S>M2 will go high. At the seventh rising edge, the SELECT output will remain low and make data selectors 61 and 62 select the new sample S. The output of flip-flop register 66 will go high. Then the outputs M1 LATCH and M2 LATCH will change as in FIG. 6. At the end of that receive time slot, the new sample S will be latched into register 46 and register 47 remains unchanged.

Figure 7:
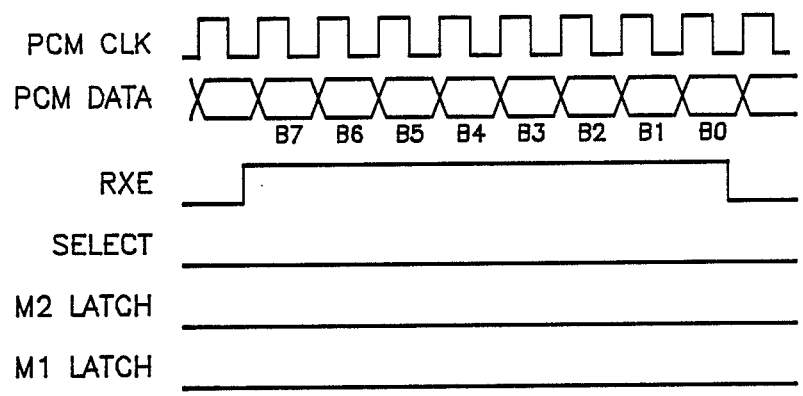
Figure 8:
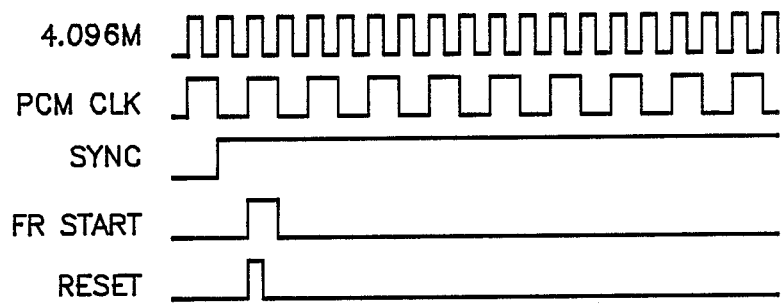
Figure 9:
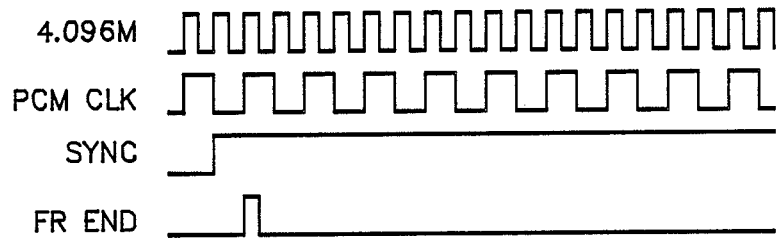

If the four most significant bits of the sample magnitude are not greater than M2 then the outputs S>M1 and S>M2 will remain low at the sixth falling edge of the PCM clock signal. The outputs M1 LATCH and M2 LATCH will remain low. Hence, none of the registers 46, 47 or 48 are affected. This example is illustrated in FIG. 7. Flip-flops 70, 71 and 72 along with "or" gate 73 form a reset circuit which resets the registers 46, 47 and 48 at the start of each time frame. The flip-flops 70 and 71 generate a RESET output signal while flip-flop 72 and "or" gate 73 utilize the RESET signal to produce a FRAME START signal. The timing of these signals is illustrated in FIG. 8. The FRAME START signal is applied directly to register 48 to reset K. The FRAME START signal clears the input of register 46 and the reset pulse makes the M1 latch signal go high and clear M1. For M2, the SELECT signal is low when the FRAME START signal is high. Data selectors 61 and 62 select input A and their output becomes low. The reset pulse makes M2 high and clears M2.

At the end of the time frame, M1 and M2 will be converted back to the inverted Mu-law or A-law coded form by "exclusive or" gates 75 and 76 and latched into shift registers 77 and 78, respectively, by the FRAME END pulse, which is generated by a pair of flip-flops 81 and 82. Also, K will be transferred into a register 80 (see FIG. 13) by the FRAME END pulse.

During the next time frame, N+1, the output of register 80 will allow only TXE3 (in this specific example) to appear during the M2 ENABLE output. All other TXE's (TXE1, TXE2, TXE4) will appear during the M1 ENABLE output. During the M1 ENABLE output, the Mu-law or A-law form of M1 is shifted out of the Q7 output of register 77 at the rising edge of the PCM clock output. Hence, all other channels, except channel KN (K3) receive the M1 sample. During the M2 ENABLE output, M2 is shifted out of register 78 through the output Q7 at the rising edge of the PCM clock signal. Therefore, channel K3 receives the M2 signal.

FIG. 14 illustrates the TSAC board 16 and it is believed that the generation of the TXE and RXE time slots does not require further explanation. The time slots for each of the integrated circuits may be selected, for example, by a DIP switch.

Thus, conferencing apparatus is disclosed which operates in conjunction with a telephone communication system to provide conferencing of a plurality of channels. Because the conferencing apparatus can be constructed from standard, off the shelf integrated circuits, it is relatively simple and inexpensive to produce. Further, the conferencing apparatus is based on comparing rather than adding the samples of the talking parties. Every user will receive the maximum magnitude sample of the other remaining parties. Therefore, the conferencing effect is that if one of the parties speaks much louder than others, the other parties will hear his voice clearly and it will be hard to hear the remaining parties. If two or more parties speak with comparable loudness, other parties in the conference will hear both speaking parties. If a party pays attention to a particular speaking party, he will be able to understand what the party says. Thus, just like a group of people speaking to each other, when several people are talking, a person will be able to hear the speaker whom he pays attention to.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. Multi-party conferencing apparatus for use in a telephone communication system, the apparatus comprising:
   input means for receiving voice data from each channel of a plurality of channels and providing a plurality of amplitude signals indicative of the amplitude of the voice data, each channel of the plurality of channels having a corresponding amplitude signal for the voice data thereon;
   comparator means coupled to receive the plurality of amplitude signals from said input means for comparing the plurality of amplitude signals and providing first and second output signals indicative of channels corresponding to the highest and second highest amplitude of voice data, respectively;
   output means for supplying voice data to the plurality of channels; and
   switching means coupled to said input means, said comparator means and said output means for operating in response to the first and second output signals from said comparator means to connect the voice data from the channel corresponding to the first output signal to all other channels of the plurality of channels and to connect the voice data from the channel corresponding to the second output signal to the channel corresponding to the first output signal.

2. Multi-party conferencing apparatus as claimed in claim 1 wherein the voice data is in digital form and the input means, comparator means, output means and switching means are all digital circuits.

3. Multi-party conferencing apparatus for use in a pulse code modulated, time division multiplexed, telephone communication system including a data bus on which operating times are divided into equal frames of time and each channel of a plurality of channels has a channel transmit time slot and a channel receive time slot in each frame, said apparatus comprising:
   input means coupled to the data bus for receiving a digital representation of a voice signal from each conferencing channel of the plurality of channels during a first frame and providing the digital representation at an output;
   comparator means coupled to the output of said input means for receiving the digital representations, comparing amplitudes of the received digital representations and providing first and second output signals indicative of the highest and second highest amplitude digital representations, respectively;
   switching and output means coupled to said input means, said comparator means and said data bus for operating in response to the first and second output signals from said comparator means to connect the highest amplitude digital representations to the data bus in a second frame and during the channel receive time slots for all conferencing channels except the conferencing channel providing the highest amplitude digital representation and to connect the second highest amplitude digital representation to the data bus in the second frame and during the channel receive time slot for the conferencing channel providing the highest amplitude digital representation.

4. In a pulse code modulated, time division multiplexed, telephone communication system having a plurality of channels, a method of multi-party conferencing comprising the steps of:

dividing the operating time into frames of predetermined duration;
sampling the voice signals on each conferencing channel each frame;
selecting the conferencing channels having the highest and second highest amplitude samples in each frame; and
supplying the highest amplitude sample to all conferencing channels except the conferencing channel from which the highest amplitude sample is obtained and supplying the second highest amplitude sample to the conferencing channel from which the highest amplitude sample is obtained, the samples being supplied in a single frame subsequent to the frame in which the supplied samples are obtained.

5. A method as claimed in claim 4 wherein the step of selecting includes comparing the samples to determine the highest and second highest.

* * * * *